May 29, 1945. O. K. BUTZBACH 2,377,206
TRANSMISSION
Filed April 20, 1940 2 Sheets-Sheet 1

INVENTOR.
Orville K. Butzbach
BY Walter E. Schirmer
ATTORNEY.

May 29, 1945.    O. K. BUTZBACH    2,377,206
TRANSMISSION
Filed April 20, 1940    2 Sheets-Sheet 2
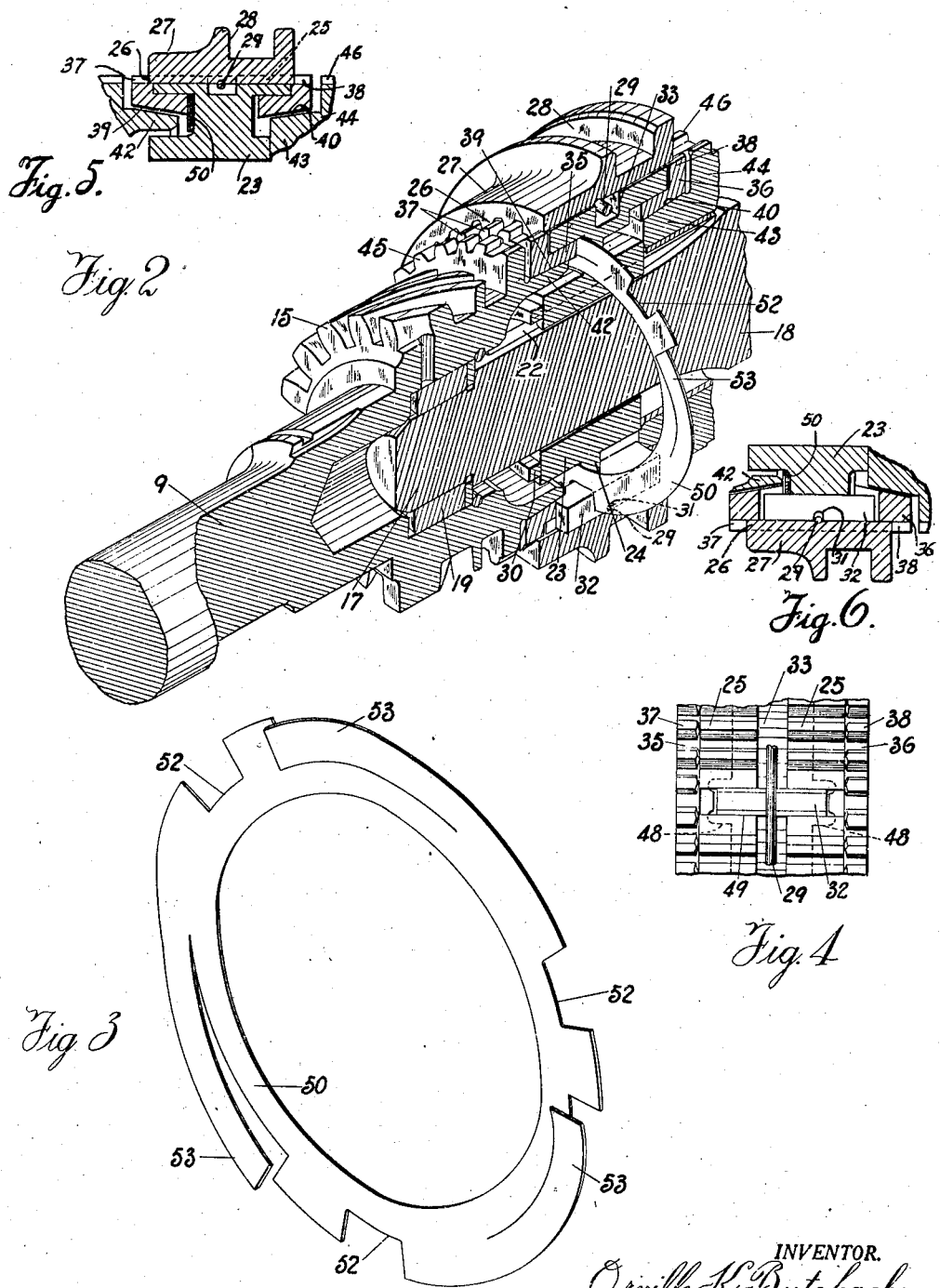
INVENTOR.
Orville K. Butzbach
BY Walter E. Skinner
ATTORNEY.

Patented May 29, 1945

2,377,206

UNITED STATES PATENT OFFICE 2,377,206

TRANSMISSION

Orville K. Butzbach, South Bend, Ind., assignor to The Studebaker Corporation, South Bend, Ind., a corporation of Delaware Application April 20, 1940, Serial No. 330,653

6 Claims. (Cl. 192—53)

This invention relates to transmissions and more particularly is directed to transmissions of the type employing synchronizing means for facilitating shifting of gears into second or intermediate speed and into high speed. The invention has been shown in connection with a passenger car type transmission employing overdrive mechanism but it is to be understood that the particular features of the present construction are equally applicable to other types of transmissions.

The primary object of the present invention is to provide a synchronizing mechanism assembled on the transmission main shaft between the second speed gear and the direct drive gear at the end of the clutch shaft which, in addition to providing for synchronizing of the gears with the transmission main shaft before shifting to the coupled position, includes means applicable to facilitate shifting into low speed gear, operated from the same synchronizer mechanism.

Another important object of the present invention is to provide means in a synchronizer of this type which will act as a brake on the clutch shaft when the car is standing still with the clutch engaged, to slow down the clutch shaft to an extent such as to prevent clashing of gears when making a low speed shift. This is of especial advantage in connection with clutches of appreciable diameter having a high polar moment of inertia, in which case it is somewhat difficult to avoid clashing of gears when shifting from neutral to low, due to the moment of inertia of the clutch shaft which in turn is constantly driving the gears on the countershaft to which the low speed gear is connected.

Still another feature of the present invention is to provide a mechanism embodying a low speed synchronizing construction which will not in any manner affect the synchronizing operation for intermediate and direct speed shifts, but at the same time will function to facilitate shifting to low speed.

A still further feature of the present invention is in the incorporation into a synchronizer mechanism of a spring means which preloads one of the friction cones in such manner as to slow down the clutch shaft rotation when shifting into low speed, which spring means may consist of a flat stamped spring ring embodied directly in the synchronizer mechanism.

Other objects and advantages of the present invention will be more apparent from the following detailed description which, taken in conjunction with the accompanying drawings, will disclose to those skilled in the art the particular construction and operation of a preferred form of the present invention.

In the drawings:

Figure 2 is a sectional perspective view of a synchronizer mechanism and associated clutch and transmission shafts showing in detail the features of the present invention;

Figure 3 is a perspective view of the preloading spring means for facilitating control of the clutch shaft rotation during low speed shifting;

Figure 4 is a detailed top plan view showing the interlocking key and cone ring engagement;

Figure 1:
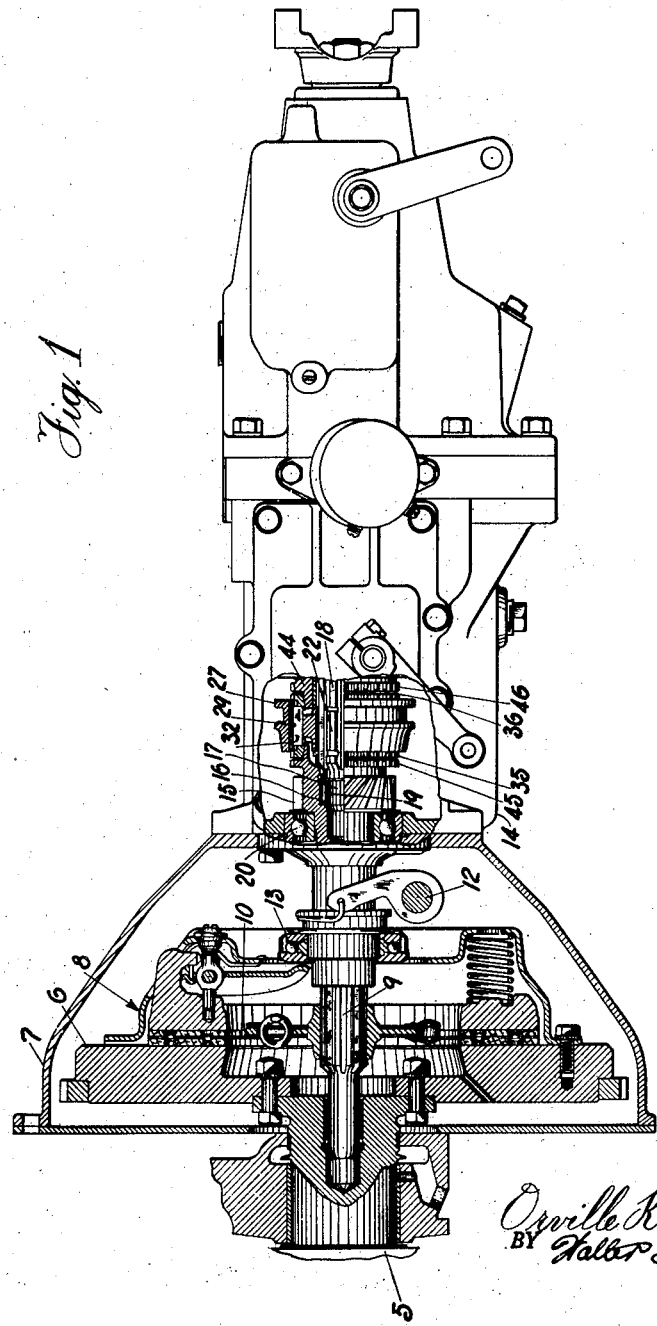
Figure 1 is a top plan view, partly in section, of a clutch and transmission assembly embodying the present invention.

Figure 5 is a detail sectional view illustrating the clutch jaw member and clutch sleeve with the interfitting clutch teeth between them for shifting the clutch sleeve relative to the clutch jaw member for actuating the synchronizing means between spaced gears, and showing a spring ring fitting into a shallow groove in the clutch sleeve for normally restraining axial shifting movement of the ring relative to the clutch sleeve; and Figure 6 is a detail sectional view illustrating the clutch jaw member and clutch sleeve with the spring ring fitting into a groove formed in the keys for locking the key for conjoint axial shifting movement with the clutch sleeve.

Referring now in detail to the drawings, in Figure 1 there is disclosed the main engine crank shaft 5 which is connected in a conventional manner at its rear end to the fly wheel 6 carried within the bell housing 7. A suitable clutch mechanism indicated generally at 8 is also disposed in the bell housing 7 and includes the clutch shaft 9 piloted into the end of the crank shaft and carrying the clutch plate 10. Suitable clutch actuating means such as the rock shaft 12 controlled by a clutch pedal and a clutch throw-out bearing 13 are provided for controlling the operating of the clutch.

The rear end of the clutch shaft extends through the bell housing into the transmission housing 14, being enlarged and recessed within the transmission housing to provide the external gear 15 and the recessed portion 16 in which is piloted the reduced stub end 17 of a transmission main shaft 18 by means of anti-friction bearings 19. This is a more or less conventional construction, it being understood that the clutch shaft is supported in the forward end of the transmission housing by means of bearings 20.

The transmission main shaft 18 is provided with a splined portion 22 upon which is mounted the clutch jaw member 23 which member is shown more in detail in Figure 2 and includes a radially extending intermediate wall 24 terminating in a cylindrical peripheral portion provided with clutch teeth 25 adapted to be continuously engaged by the internal teeth 26 of a clutch sleeve 27. The sleeve 27 is provided with an annular channel portion or groove 28 adapted to receive a suitable shifter yoke for moving the sleeve axially relative to the shaft 18. The teeth 26 of the sleeve 27 are interrupted intermediate their ends by detent portions forming an annular shallow groove as shown in Figures 2 and 5, which groove is adapted to receive the spring ring 29 which ring is disposed internally of the sleeve and is normally held against relative axial movement with respect to the sleeve by the detent engagement.

The clutch jaw member 23 is held in position against axial movement on the splines 22 of the shaft 18 by means of a snap ring 30 which snap ring engages in an annular groove formed in the splines to thereby hold the clutch member 23 against axial movement. At circumferentially spaced points the peripheral portion of the clutch member 23 is provided with axially extending slots 49 as more clearly shown in Figures 4 and 6 which extend down into the radial portion 24 thereof. These slots are adapted to receive blocks or keys 32 extending transversely thereacross. The peripheral portion of the keys have external lateral grooves 31 for receiving the spring ring 29 whereby the keys are resiliently locked or coupled through the spring ring 29 for conjoint axial movement with the clutch sleeve 27. The clutch member 23 is also provided with an annular groove 33 formed in the peripheral surface thereof providing clearance for the spring ring 29.

The opposite end portions of the periphery of the clutch member 23 are recessed to receive the cone rings 35 and 36, respectively, each of these rings being provided with radially extending external teeth 37 and 38, respectively, normally disposed outside of the ends of the clutch sleeve 27. The facing portions of the teeth 37 and 38 directed toward the ends of the sleeve 27 are chamfered with respect to the teeth 26 of the clutch sleeve. The cone rings 35 and 36 are each provided with internal frusto-conical friction surfaces 39 and 40, respectively, which are adapted to have braking engagement with corresponding frusto-conical extensions 42 and 43 formed on the enlarged portion of the clutch shaft 9 adjacent the gear 15 and on the adjacent end of the second speed gear 44. Spaced radial slots 48 are formed in the opposed hub portions of the gears 35 and 36. The ends of the keys 32 fit into these slots which are of a width so that the gear teeth of the gears 35 and 36 may be disposed relative to the teeth 26 of the clutch sleeve 27 a distance substantially equal to one-half of the width of one of the gear teeth in either direction. The gear 15 is provided, intermediate the teeth thereof and the extension 42, with a set of radially extending clutch teeth 45 which are of the same shape and size of the teeth 37 of the associate cone ring 35 and which are correspondingly chamfered.

In the operation of the construction thus far described, the mechanism is shown in substantially neutral position in Figures 1 and 2. When it is desired to connect the second speed or intermediate gear 44 to the main transmission shaft 18, the clutch sleeve 27 is energized through suitable gear shift means to move to the right as viewed in Figures 1 and 2. This initial movement through the coupling between the teeth 26, spring ring 29 and keys 32 tends to move the cone ring 36 to the right against the tapered friction surface 40 and consequently tends to bring the gear 44 and the transmission shaft 18 into substantially synchronous speed. Until such speed is obtained the frictional drag on the ring 36 results in rotating this ring relative to the clutch sleeve 27 a half tooth space, due to the circumferentially enlarged notch 48 in the hub of the cone ring 36 receiving the right-hand end of the key 32, thereby moving the clutch teeth 38 of the cone ring 36 out of alinement with the teeth 26 of the sleeve 27, and thus blocking further axial movement of the sleeve 27 until such time as the ring 36 and gear 44 reach synchronous speed. At this time any relative rotation between the sleeve 27 and the gear 44 has been eliminated and consequently, due to the chamfered ends of the teeth 38, the sleeve 27 may move axially over the teeth 38, the spring ring 29 at the same time being contracted to release the coupling engagement between the keys 32 and the teeth 26. The sleeve 27 is thereby shifted over the cone ring 36 for meshing engagement with the teeth 46 of the gear 44, thereby coupling the gear 44 and the sleeve 27 rigidly together and thus effecting a positive clutching of the gear 44 to the shaft 18 by means of the clutch member 23. When the sleeve 27 is shifted back toward neutral position the spring ring will engage in the detents of the teeth 26 and recouple the keys 32 to the clutch sleeve 27.

It will be apparent from Figure 4 that the hub portions of the cone rings 35 and 36, which on their internal surfaces form the friction surfaces 39 and 40, are provided with circumferentially spaced radial slots 48 which are of greater width than the width of the keys 32 and of the transverse slots 49 in the clutch member 23. As a result, the cone rings have limited rotative movement relative to the member 23 and consequently can rotate the half tooth space required to provide the blocking engagement for blocking actual shifting of the sleeve 27 until such time as the parts are substantially synchronized in rotation.

The shifting movement for producing direct drive between the clutch shaft 9 and the transmission shaft 18 is effected by shifting the sleeve 27 to the left, as viewed in Figures 1 and 2, which results in forcing the keys 32 against the base of the slots 48 in the ring 35 tending to push the ring axially to the left onto the friction surface 42 of the gear 15. As a result, the ring 35 is rotated relative to the member 23 to bring the teeth 37 thereof out of alinement with the internal teeth 26 of the sleeve 27, blocking further movement of the sleeve until this displacement is reduced by reason of the gear 15 and shaft 18 assuming substantially synchronous rotation. When this has occurred the load on the ring 35 is reduced and due to the chamfered ends of the teeth the sleeve 27 can slide axially over the teeth 37 of the ring 35 and over the chamfered ends of the teeth 45 of the gear 15 whereby the sleeve 27 positively couples the clutch teeth 45 and the teeth 25 in the clutch member 23 together to clutch the gear 15 to the shaft 18.

The low speed gear shift is effected by the gearing on the counter shaft (not shown) and the gearing (not shown) on the transmission shaft spaced rearwardly of the gear 44. However, when the engine is operating and the car is standing still with the shift mechanism in neutral position it is obvious that momentary disengagement of the clutch and simultaneous shifting into low speed may produce clashing of gears due to the fact that the clutch shaft 9 has a relatively high moment of inertia and consequently continues to rotate thereby rotating the counter shaft gears at an appreciable speed which may produce the undesired clashing.

To eliminate this disadvantage and facilitate smooth shifting from neutral into low speed, I provide a spring disc 50 located in the synchronizer mechanism on the shaft 18 between the inner end of the cone ring 35 and radial portion 24 of the clutch member 23. The spring disc 50 is provided with notches or slots 52 which fit about the keys 32 and adjacent these notched portions is provided with arcuate stamped out resilient finger portions 53 directed axially away from the radial wall 24 and bearing against the inner radial surface of the cone ring 35. The spring disc 50 by reason of the notches 52 fitting about the keys 32 is coupled to the groove member 23 and rotates therewith. By reason of this construction, when the synchronizer mechanism is in neutral position and the clutch 8 is disengaged, the resilient finger portions 53 press on the inner end of the cone ring 35 and tend to force this ring axially to the left thereby moving the friction surface 39 thereof over the friction surface 42 of the shaft 9. This acts as a brake on the clutch shaft 9 and greatly retards its rotation immediately upon releasing of the clutch.

As a result, the shaft 9 is slowed down to an extent such that the shifting engagement with the counter shaft gear for low speed is facilitated without producing any clashing. The spring load produced by the fingers 53 must be such as to reduce this retarding action without, however, being sufficiently great to provide a positive brake that would stop rotation of the clutch shaft 9 during the transfer of or shifting into low speed. The reason for this is that it is desired to have the countershaft gears rotated slowly to prevent endwise abutment of the teeth on the gear on the transmission main shaft against the counter shaft gear teeth which would block the shifting movement. With the construction disclosed I find that a spring pressure of about one pound is sufficient to accomplish the brake action for retarding rotation of the shaft 9 without producing the undesirable effect of completely stopping its rotation within the interval that the first speed shift is accomplished. This stamping may be readily inserted into position during assembly of the synchronizer mechanism and in no way affects the action of the synchronizer mechanism in so far as the clutching action between the shaft 15 and gears 44 is concerned.

It is thus believed apparent that I have provided a novel type of mechanism embodied in a synchronizer construction which primarily is intended for producing a synchronizing shifting of gears in intermediate and high speeds but at the same time facilitates the shifting into low speed.

I am aware that various changes may be made in details of the synchronizer mechanism per se without in any manner departing from the particular features of the present construction and I therefore do not intend to be limited except as defined by the scope and spirit of the appended claims.

I claim:

1. The combination, with a transmission having a main shaft, a pair of coaxial axially spaced gears relatively rotatable with respect to the shaft and having external clutch teeth and friction surfaces of reduced diameter, a synchronizing clutch including a hub portion fixed on said shaft and a peripheral portion having external clutch teeth, friction clutch elements carried in opposite ends of the peripheral portion and having corresponding clutch teeth, a sleeve encircling said peripheral portion having internal clutch teeth meshing therewith and axially shiftable to clutch said gears selectively to said shaft, of an annular spring disc having axially offset spring fingers biased between said hub portion and one of said friction clutch elements normally urging said element into frictional engagement with the adjacent gear, and axially disposed bar members carried in said peripheral portion holding said spring disc against rotation relative to said hub portion, said one friction clutch element having axially notched recesses receiving the ends of said bar members and arranged to provide limited rotation of said element relative to said peripheral portion.

2. The combination with a transmission comprising a main shaft, a pair of coaxial axially spaced gears rotatable relative to said shaft and having external clutch teeth and friction surfaces, a synchronizing clutch including a hub fixed on said shaft having a peripheral portion provided with external clutch teeth, friction clutch elements carried in opposite ends of said peripheral portion and having corresponding clutch teeth, a sleeve encircling said peripheral portion having internal clutch teeth meshing therewith and axially shiftable to clutch said gears selectively to said shaft, of an annular spring disc having axially offset spring elements biased between said hub portion and one of said friction clutch elements normally urging said element into frictional engagement with the adjacent gear, and axially disposed bar members carried in said peripheral portion holding said disc against rotation relative to said hub portion, said one friction clutch element having axial slots receiving the ends of said bar members and arranged to provide limited rotation of said element relative to said peripheral portion.

3. The combination, with a transmission comprising a main shaft, a pair of coaxial axially spaced gears rotatable relative to said shaft and having external clutch teeth and friction surfaces, a synchronizing clutch including a hub fixed on said shaft having a peripheral portion provided with external clutch teeth, friction clutch elements carried in opposite ends of said peripheral portion and having corresponding clutch teeth, a sleeve encircling said peripheral portion having internal clutch teeth meshing therewith and axially shiftable to clutch said gears selectively to said shaft, of an annular spring disc having peripheral notches and axially offset spring elements biased between said hub portion and one of said friction clutch elements normally urging said element into frictional engagement with the adjacent gear, and axially disposed bar members carried in said peripheral portion extending through said notches and holding said disc against rotation relative to said hub portion, said one friction clutch element having axial slots receiving the ends of said bar members and arranged to provide limited rotation of said element relative to said peripheral portion.

4. In a transmission, a pair of axially spaced gears each having clutch teeth and friction clutch surfaces, a coaxial shaft rotatable relative to said gears and having a splined portion intermediate said gears, a synchronizer mechanism comprising a clutch member mounted on said splined portion and having friction clutch elements carried thereby respectively engaged with said clutch surfaces, said mechanism also having a positive clutch element engageable selectively with said clutch teeth, selective means for shifting said synchronizer mechanism to first engage one of said friction clutch elements with the associated gear surface and then engage the positive clutch element with the associated clutch teeth after synchronous rotation of the shaft and the gear is attained, and a spring disc in said synchronizer mechanism positively held against rotation relative to said clutch member and constantly reacting against one of said friction clutch elements to retard free inertial rotation of the associated gear.

5. In a synchronizer, a shaft engaging member having axially spaced series of clutch teeth, a sleeve encircling said member having intermeshing series of clutch teeth, friction clutch elements at opposite ends of said synchronizer having internal friction surfaces and external clutch teeth adapted to be engaged by said sleeve upon axial shifting thereof relative to said member, and a spring disc biased between said member and one of said clutch elements tending to separate them axially, said member and said disc having cooperating interengaging means positively holding them against relative rotation.

6. In a transmission, a pair of axially spaced gears each having clutch teeth and friction clutch surfaces, a shaft coaxial with and rotatable relative to said gears, a synchronizing clutch member fixed on said shaft having external gear teeth, friction clutch elements carried in opposite ends of said member and having corresponding clutch teeth, a sleeve slidable on said member having internal clutch teeth meshing therewith and shiftable to clutch said gears selectively to said shaft, a spring disc biased between said member and one of said clutch elements urging said one element toward the corresponding friction clutch surface for frictional engagement therewith, said disc having peripheral notches therein and said one friction clutch element having axially extending slots therein outward beyond said disc, and bar members carried by said member restrained against relative rotation about the axis thereof and extending through said notches and into said slots, said bar members fitting snugly in said notches and positively holding said disc against rotation relative to said member and said slots being of greater width than said bar members whereby said friction clutch element and said synchronizing clutch member have limited relative rotation.

ORVILLE K. BUTZBACH.